A. R. SMITH.
POWER SYSTEM.
APPLICATION FILED APR. 9, 1917.
1,270,561.
Patented June 25, 1918.
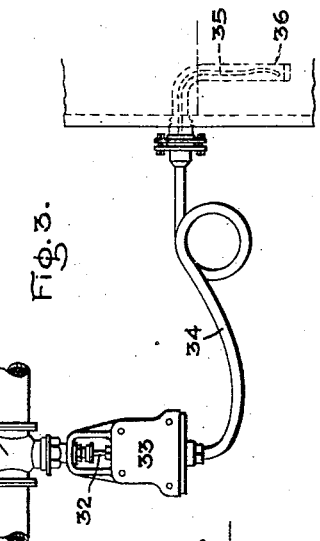
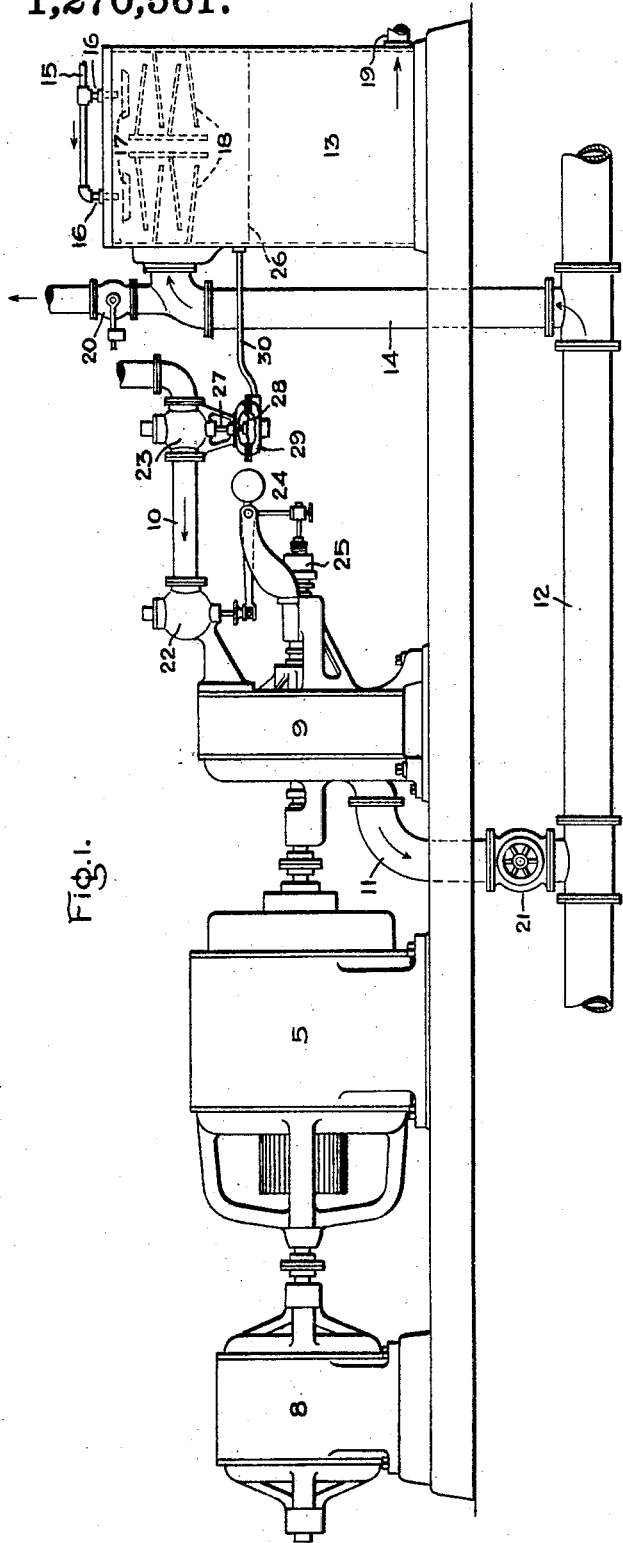
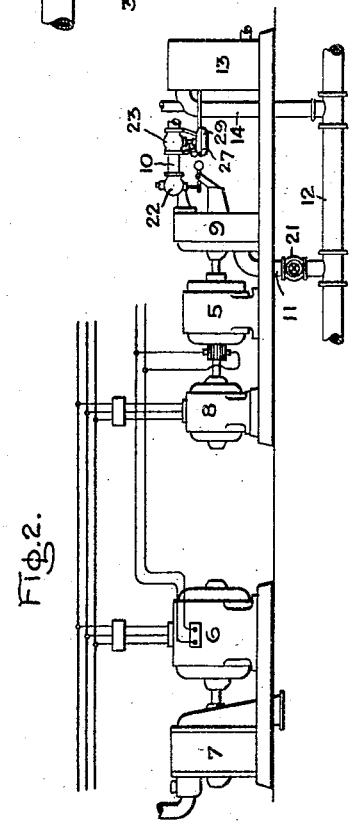
Inventor
Arthur R. Smith
by
His Attorney.

UNITED STATES PATENT OFFICE.

ARTHUR R. SMITH, OF SCHENECTADY, NEW YORK, ASSIGNOR TO GENERAL ELECTRIC COMPANY, A CORPORATION OF NEW YORK.

POWER SYSTEM.

1,270,561.  Specification of Letters Patent.  Patented June 25, 1918.

Application filed April 9, 1917. Serial No. 160,640.

*To all whom it may concern:*

Be it known that I, ARTHUR R. SMITH, a citizen of the United States, residing at Schenectady, in the county of Schenectady, State of New York, have invented certain new and useful Improvements in Power Systems, of which the following is a specification.

In power stations it is now customary to use in connection with the main condensing engine, as a turbine, which drives the main generator, one or more smaller non-condensing engines as non-condensing turbines to drive the auxiliaries, the exhaust steam from the non-condensing engine or engines being used to heat the feed water, or for industrial purposes, or both. The load of the auxiliaries is fairly constant whether the main engine is operating at full load or lighter load. The demand for exhaust steam, however, to heat the feed water will vary with the load on the main engine, as is obvious.

Unless the exhaust steam from the non-condensing engine or engines is utilized to heat the feed water and otherwise, the overall efficiency of the plant is improved by driving the auxiliaries by means of motors connected to the main generator. On the other hand, it is desirable to have an engine accessible for driving the auxiliaries in starting up and for use in case of accident to the main machine.

The object of my present invention is to provide an improved system which will operate at the best economy, and to this end I provide, in connection with the auxiliaries, both a motor and a non-condensing engine for driving them. I then utilize the non-condensing engine for driving the load of the auxiliaries up to the point at which its exhaust can be efficiently utilized to heat the feed water, or to heat the feed water and for any other purpose and drive the remainder of the load of the auxiliaries by means of the motor.

For a consideration of what I believe to be novel and my invention, attention is directed to the accompanying specification and the claims appended thereto.

In the accompanying drawings, Figure 1 is a diagrammatic view of a part of a system embodying my invention; Fig. 2 shows the part of the system of Fig. 1 in relation to the main engine unit, and Fig. 3 is a modification of a detail.

Referring to the drawing, 5 indicates an auxiliary, here shown as a direct current exciter, for the main alternating current generator 6 driven by a condensing engine, as the condensing steam turbine 7. 8 indicates an alternating current motor coupled to the rotor of the exciter 5, and 9 a non-condensing engine, as a turbine, also coupled thereto. The motor 8 is electrically connected to the generator 5, as indicated in Fig. 2. The turbine 9 receives elastic fluid through the conduit 10 and exhausts through conduit 11 into a header 12. 13 indicates a feed water heater connected to the header 12 by conduit 14 to receive exhaust fluid therefrom. The feed water heater 13 is shown diagrammatically, and by way of example, as comprising a casing into the top of which feed water is conveyed by a pipe 15 having a number of branch pipes 16. The water dropping from the branch pipes 16 falls onto trays 17 and overflows onto a series of baffles 18. The exhaust steam from conduit 14 enters adjacent these baffles and encountering the water serves to heat it, at the same time being condensed thereby. 19 indicates a pipe through which the feed water is drawn off to be fed to the boilers, and 20 a suitable pressure relief valve which is set to open in case of excess pressure in the conduit 14. In the conduit 11 is a hand regulating valve 21. In the conduit 10 through which elastic fluid is fed to the turbine 9 is a regulating means which controls the flow of elastic fluid in accordance with the speed of the machine and the temperature of the feed water. In the present instance this is accomplished by providing two valves 22 and 23 arranged in series with each other. The valve 22 is connected through suitable mechanism 24 to a speed governor 25. In the drawing the parts are shown diagrammatically and as comprising a simple form of lever, but it will be understood that in actual practice any approved form of governor and valve actuating means may be employed. The valve 23 is arranged to be controlled by the temperature of the feed water. In the arrangement shown in Fig. 1, I take advantage of the fact that the temperature of the feed water within certain limits varies with the pressure in the casing of the heater 13 above the water line therein, the water line being indicated at 26, and connect the spindle 27 of valve 23 to a movable abutment arranged to move in accordance with the pressure in the feed water heater 13. In the present instance, the valve stem 27 is connected to a diaphragm 28 located in a casing 29. The casing 29 below the diaphragm is connected by a pipe 30 to the feed water casing. By this arrangement when the temperature of the feed water increases or decreases, the pressure under the diaphragm increases or decreases and closes off or opens up more or less the valve 23.

In Fig. 3 is shown a modification wherein the valve 23ᵃ corresponding to valve 23 of Fig. 1 is controlled by a mechanism directly responsive to temperature. The valve stem 32 of valve 23ᵃ is connected to a movable abutment in a casing 33. The casing 33 below the abutment is connected by a pipe 34 to a small tube 35 which is open at its lower end and is sealed in a closed tube 36. The pipe 34 and tubes 35 and 36 contain a suitable expansible fluid so that with increase in temperature of the feed water it will expand, thereby increasing the pressure on the movable abutment in casing 33 and closing off the valve 23ᵃ to a greater or less extent. On the other hand, if the temperature decreases, then the pressure under the movable abutment in casing 33 will decrease permitting the valve to open more.

In the operation of the apparatus described, the governor 25 is set for a certain maximum speed, preferably somewhat above the synchronous speed of the motor 8. The temperature regulating mechanism is set to maintain the feed water at the desired temperature. The turbine 9 is used in starting up and it will tend to carry the full load. So long as all the exhaust steam from turbine 9 is utilized to heat the feed water, or to heat the feed water and for other industrial purposes, the turbine 9 will continue to carry the full load of the auxiliary. As soon as, or whenever the supply of exhaust steam exceeds that required for heating the feed water, then the valve 23 will be closed somewhat, thereby cutting down the supply of elastic fluid to the turbine 9. This will cause its speed to decrease, and as soon as it falls below synchronous speed, the motor 8 will come into play and take up the load which the turbine has dropped. Under these conditions, the speed governor is entirely out of action and the admission of elastic fluid to the turbine 9 is entirely under the control of the temperature actuated valve 23. The load of the auxiliary is now automatically shifted back and forth between the motor 8 and turbine 9 in accordance with the temperature of the feed water, the load on the motor, of course, depending upon the amount by which the speed is reduced. The change in speed necessary in shifting the load depends upon the slip of the motor from no load to full load, but in any event it is not great and has no great effect on the auxiliary.

In accordance with the provisions of the Patent Statutes I have described the principle of operation of my invention, together with the apparatus which I now consider to represent the best embodiment thereof; but I desire to have it understood that the apparatus shown is only illustrative, and that the invention can be carried out by other means.

What I claim as new and desire to secure by Letters Patent of the United States, is:—

1. In a power system, the combination of a main condensing unit comprising an elastic fluid engine and a generator driven thereby, an auxiliary, a non-condensing engine and a motor for driving the auxiliary, said motor being connected to said generator, a feed water heater, means for conveying exhaust from the non-condensing engine to the feed water heater, and means controlled by the temperature of the feed water for regulating the admission of elastic fluid to the non-condensing engine.

2. In a power system, the combination of a main condensing unit comprising an elastic fluid engine and an alternating current generator driven thereby, a direct current exciter for the generator, a non-condensing engine and an alternating current motor, both connected to the exciter to drive it, said motor being electrically connected to the main generator, a feed water heater, means for conveying exhaust from the non-condensing engine to the feed water heater, and valve mechanism controlled by the speed of the non-condensing engine and by the temperature of the feed water for regulating the admission of elastic fluid to the non-condensing engine.

3. The combination of a feed water heater, an elastic fluid engine, a load driven thereby, conduit means for conveying the exhaust from the engine to the feed water heater, and means controlled by the temperature of the feed water for regulating the admission of elastic fluid to the engine.

4. The combination of a feed water heater, a load, an elastic fluid turbine, and a motor connected to the load, conduit means for conveying the exhaust from the turbine to the feed water heater, and a temperature responsive means and a speed governor for regulating the admission of elastic fluid to said turbine, said temperature responsive means being controlled by the temperature of the feed water, and said governor being set for a speed at least equal to the no load speed of the motor.

5. The combination of a feed water heater, a load, an elastic fluid turbine and an alternating current motor connected to the load, conduit means for conveying the exhaust from the turbine to the feed water heater, and a temperature responsive means and a speed governor for regulating the admission of elastic fluid to said turbine, said temperature responsive means being controlled by the temperature of the feed water, and said governor being set for a speed at least equal to a synchronous speed of the motor.

In witness whereof, I have hereunto set my hand this 7th day of April, 1917.

ARTHUR R. SMITH.

Copies of this patent may be obtained for five cents each, by addressing the "Commissioner of Patents, Washington, D. C."